United States Patent [19]

Visage

[11] Patent Number: 5,144,365
[45] Date of Patent: Sep. 1, 1992

[54] DEVICE FOR REPRODUCING IMAGES, BY CONTACT, ON AN UNEXPOSED PHOTOGRAPHIC FILM FROM A TRANSPARENT ORIGINAL

[76] Inventor: Albert B. Visage, Saint Germain des Prés, 45220 Chateaurenard, France

[21] Appl. No.: 775,725

[22] Filed: Oct. 11, 1991

[30] Foreign Application Priority Data

Oct. 15, 1990 [FR] France .................. 90 12686

[51] Int. Cl.$^5$ ............................................. G03B 27/20
[52] U.S. Cl. .................................................. 355/91
[58] Field of Search ................ 355/87, 91, 93, 94, 355/92

[56] References Cited

U.S. PATENT DOCUMENTS

| | | | |
|---|---|---|---|
| 3,280,715 | 10/1966 | Corl et al. | 355/91 |
| 3,547,537 | 12/1970 | Betron | 355/92 |
| 3,604,800 | 9/1971 | Jordan et al. | 355/91 |
| 3,658,417 | 4/1972 | Lewis et al. | 355/94 |
| 3,794,419 | 2/1974 | Flor et al. | 355/91 |
| 3,834,815 | 9/1974 | Grieg | 355/91 |
| 4,888,488 | 12/1989 | Miyake | 355/874 |

*Primary Examiner*—Richard A. Wintercorn
*Attorney, Agent, or Firm*—Zarley, McKee, Thomte, Voorhees, & Sease

[57] ABSTRACT

The reproduction device according to the invention comprises a support (3) provided with a window (4), the original (2) being intended to block the window, while the film (1) is intended to be placed in front of the original, a frame (5) located in front of the support (3), on the side of the original and of the film, and provided with pressing means (6) opposite the portion of the film disposed in front of the original, the support and the frame being displaceable in relation to one another between an inactive position in which the pressing means do not exert any action on the film and the original, and an active position in which the pressing means first of all press the film against the original, and then the original against the support, means for creating a negative pressure between the original and the film when the support and the frame are in their active positions, and a light source located on the side of the support (3) that is opposite the frame for printing the film through the original.

It prevents air from being trapped between the film 1 and the original 2 and permits the reproduction of excellent quality images.

9 Claims, 3 Drawing Sheets

DEVICE FOR REPRODUCING IMAGES, BY CONTACT, ON AN UNEXPOSED PHOTOGRAPHIC FILM FROM A TRANSPARENT ORIGINAL

The present invention relates to a device for reproducing images, by contact, on an unexposed photographic film from a transparent original, in particular a photographic negative or a slide.

In order to obtain images of excellent quality by contact, it is essential for the photographic film and the original to be perfectly pressed against one another. Now, with current reproduction apparatus, air bubbles remain trapped between the film and the original so that they cannot come into intimate contact with one another to permit the reproduction of images having the desired quality.

The present invention proposes more particularly to remedy this drawback and, in order to do so, it provides a device for reproducing images, by contact, which is characterized in that it includes a support provided with a window, the original being designed to block the window, while the film is designed to be placed in front of the original, a frame located in front of the support on the side of the original and of the film, and provided with pressing means opposite the portion of the film placed in front of the original, the support and the frame being displaceable in relation to one another between an inactive position, in which the pressing means have no action on the film ad the original, and an active position in which the pressing means apply firstly the film against the original, and then the original against the support, means for creating a negative pressure between the original and the film when the support and the frame are in their active position, and a light source located on the support side that is opposite the frame for printing the film through the original.

Thanks to the negative pressure created between the original and the film, no air bubbles can now be retained between the latter, which permits the reproduction of pictures of excellent quality.

According to one particular form of embodiment of the invention, the support is formed by a plate, while the frame includes a body provided with a central recess located opposite the window and the dimensions of which are greater than those of the latter, an annular seal fixed around the recess, on a portion of the body that is turned towards the plate, and a membrane fixed at the portion of the body that is away from the plate and projecting out of the recess in such a way that it comes closer to the plate than the seal under the action of the pressing means, the plate, the body, the seal and the membrane delimiting, in the active position of the support and of the frame, a negative pressure chamber suitable for connection to a vacuum source.

According to this form of embodiment, the pressing means are preferably formed by a small plate held by elastic members against the face of the membrane that is away from the film and the original.

In order for it to be able to exercise its pressure applying function under optimum conditions, the small plate bears, on its face opposite the membrane, rods about which are disposed helicoidal springs, these rods freely passing through a lid fixed onto the portion of the body that is away from the seal, while the springs are compressed between the small plate and the cover.

Preferably, the cover and the membrane are fixed to the body of the frame by common fixing members, which makes it possible to simplify the structure of the reproduction device and to reduce the cost price of the latter.

Advantageously, the body of the frame contains, around the recess, a buffer chamber suitable for being connected to the vacuum source, the portion of the body of the frame that delimits the negative pressure chamber being provided with a series of orifices designed to connect the latter to the buffer chamber.

The buffer chamber and the orifices that connect it to the negative pressure chamber enable the negative pressure to be rendered uniform in the latter, which facilitates the elimination removal of the air bubbles trapped between the film and the original and improves the efficiency of the reproduction device.

According to another form of embodiment of the invention, the support includes a body provided with a central recess delimiting the window, and an annular seal fixed around the window, on the portion of the body that is turned towards the frame, which includes a plate whereof the face turned towards the body bears the pressing means and is clad with a membrane covering the latter, the body, the seal and the membrane delimiting, in the active position of the support and of the frame, a negative pressure chamber suitable for connection to a vacuum source.

According to this other embodiment, the body of the support contains around the recess a buffer chamber suitable for connection to the vacuum source, the portion of the body which delimits the negative pressure chamber being provided with a series of orifices designed to connect the latter to the buffer chamber.

Furthermore, the pressing means are preferably constituted by a small plate projecting slightly out of a cavity provided in the plate under the action of elastic members pressing it against the membrane.

To prevent air bubbles from being retained between the membrane and the small plate and thus being liable to prevent intimate contact between the film and the original from being achieved, it is desirable for the small plate to comprise grooves on its face turned towards the membrane.

Two forms of embodiment of the present invention will be described hereinafter with reference to the annexed drawings, wherein.

Figure 1:
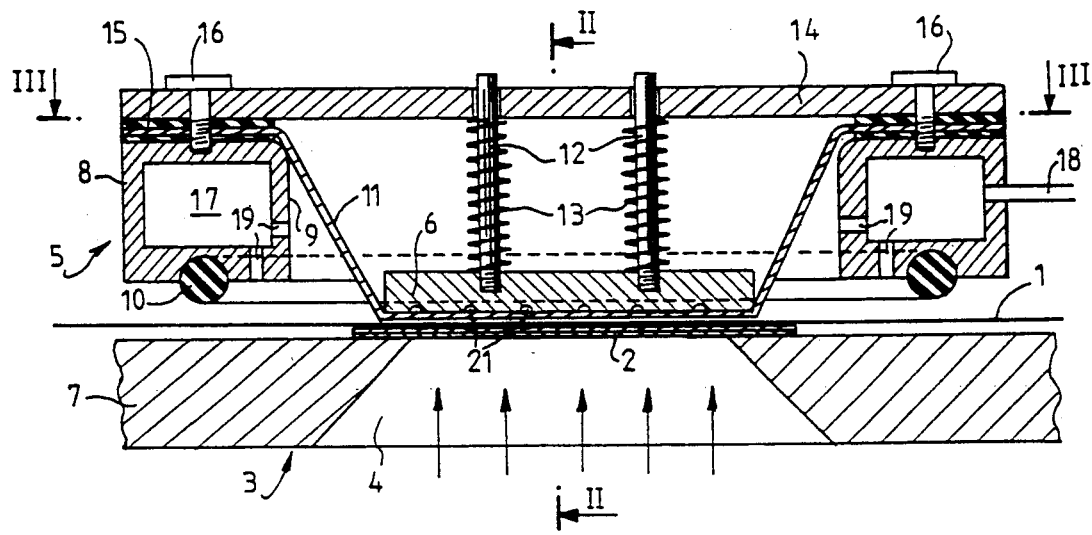
FIG. 1 is a schematic cross-sectional view of a reproduction device according to the invention, the cross-section being take along line I—I of FIG. 2 and showing the support and the frame in inactive position.

The devices shown in the drawings have been developed to reproduce images, by contact on a photographic film 1 from a transparent original 2 such as a photographic negative or a slide.

Film 1 and the original 2 are of conventional design and do not need to be described herein. It will simply be pointed out that they are provided with perforations (not shown) on each of their longitudinal sides.

Each of the two reproduction devices according to the invention includes a support 3 provided with a rectangular window 4, and a frame 5 located in front of support 3 and provided with pressing means 6, the role of which will be described hereinafter.

The dimensions of the original 2 are slightly larger than those of window 4. It is designed to be fixed to support 3 in such a way that it blocks the window, it being fixed by applying its perforated longitudinal sides against the longitudinal sides of the window and immobilizing it using appropriate means (not shown) such as an adhesive tape or a slide.

Film 1, which is substantially as wide as the original 2, is inserted between support 3 and frame 5 so as to extend parallel to original 2, at the same time facing it.

In each of the two reproduction devices represented, support 3 and frame 5 can be displaced in relation to one another between an inactive position (shown in FIGS. 1 and 2, in the case of the first device, and in FIG. 5, in that of the second device) wherein the pressing means exert no action on film 1 and original 2, and an active position (shown in FIG. 4, in the case of the first device, and in FIG. 6 in that of the second one) wherein pressing means 6 first press film 1 against original 2, and then the latter against support 3.

The two reproduction devices according to the invention also include means for creating a negative pressure between the original 2 and film 1 when support 3 and frame 5 are in their active positions, and a light source (not shown) of the type commonly used in photography, this source being located on the side of support 3 which is opposite frame 5 in order to print film 1 through original 2.

The reproduction device represented in FIGS. 1 to 4 will now be described in greater detail.

In these figures, it will be noted that support 3 is formed by a simple plate 7 bearing original 2 on its upper face, and that window 4 has a cross-section that decreases upwardly in the direction of propagation of the light emitted by the light source, which prevents the occurrence of parasitic reflections.

It will also be noted that frame 5, which is placed above plate 7, includes a body 8 provided with a central rectangular recess 9 located opposite window 4 and the dimensions of which are greater than those of the latter, an annular seal 10 fixed around recess 9 on the lower face of body 8, and a membrane 11 fixed to the upper face of body 8, this membrane penetrating recess 9 and coming closer to plate 7 than seal 10 under the action of pressing means 6.

In the form of embodiment represented in FIGS. 1 to 4, the pressing means 6 are constituted by a small plate extending parallel to plate 7 and bearing on its upper face rods 12 around which are disposed helicoidal springs 13.

Rods 12 freely pass through a cover 14 resting on the periphery of membrane 11 via a seal 15, cover 14 and membrane 11 being fixed to body 8 by common fixing members 16 such as screws or bolts.

Springs 13 are compressed between cover 14 and small plate 6 and thus maintain the latter against the upper face of membrane 11.

Figure 2:
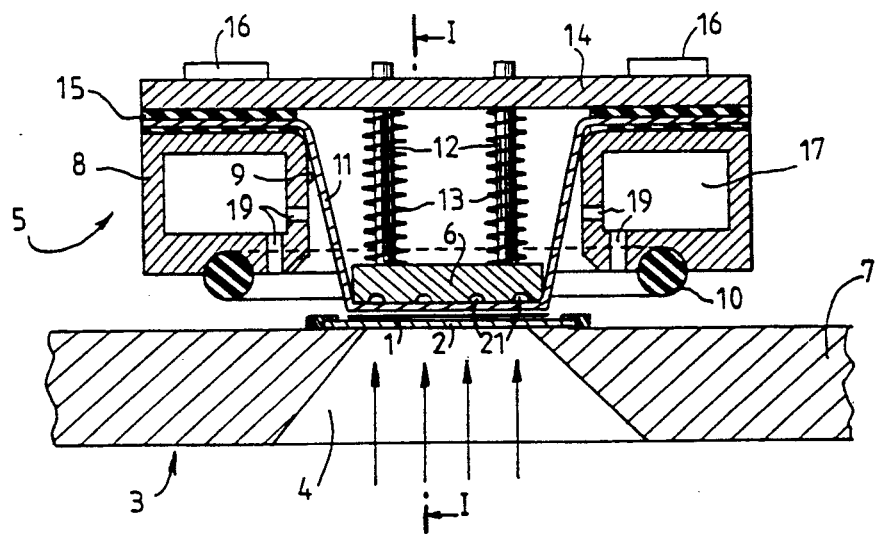
FIG. 2 is a schematic cross-sectional view along line II—II of FIG. 1.
Figure 3:
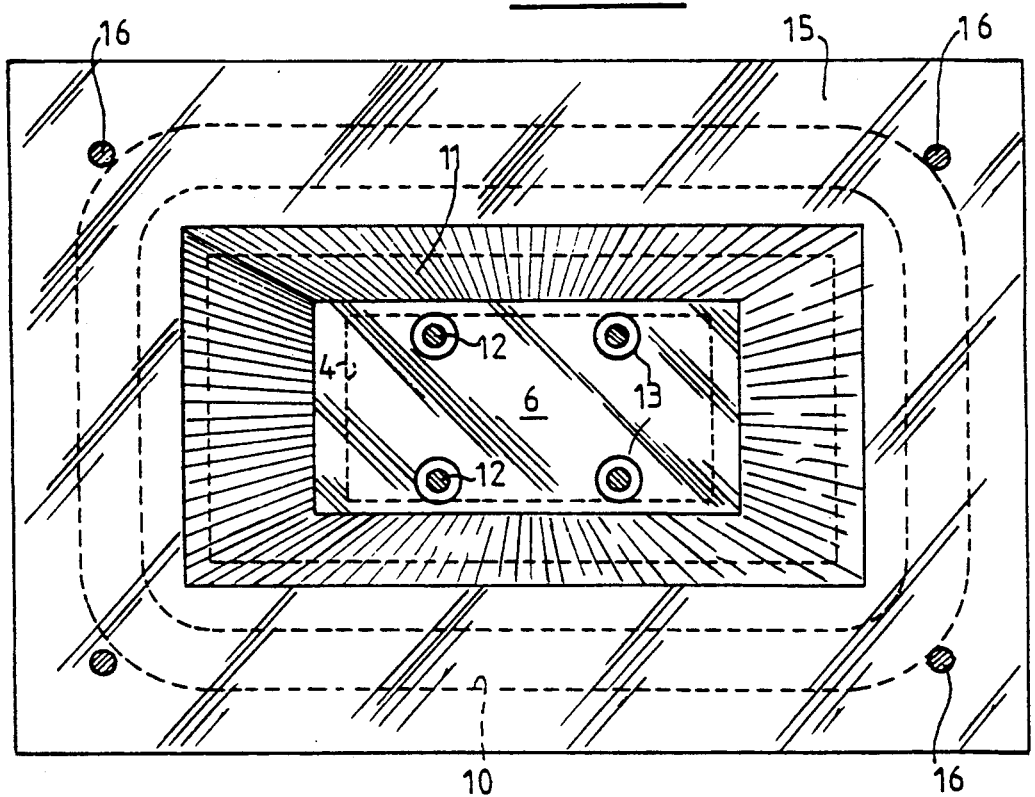
FIG. 3 is a schematic cross-sectional view along line III—III of FIG. 1.
Figure 4:
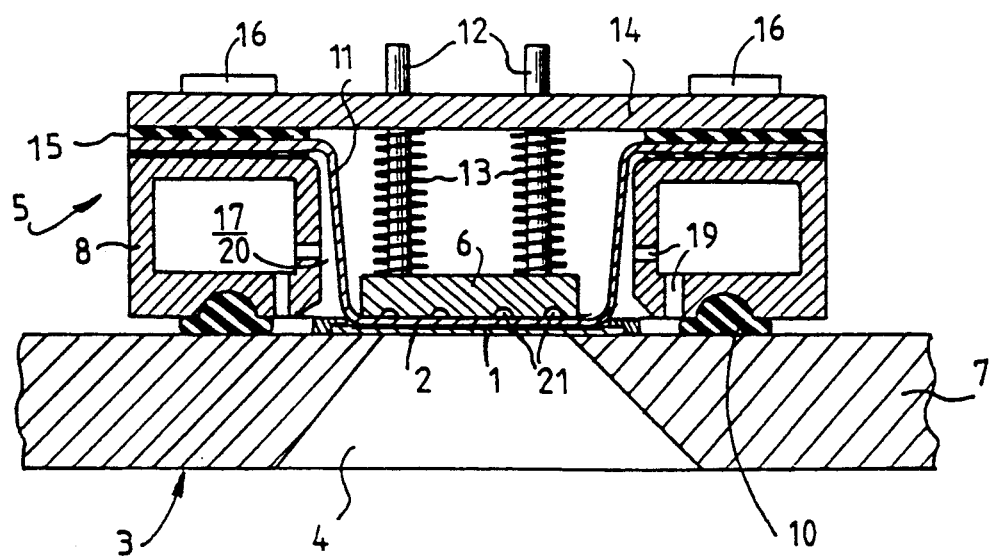
FIG. 4 is a view analogous with that of FIG. 2, but showing the support and the frame in their active positions.

When plate 7 and frame 5 are displaced from their inactive positions, shown in FIGS. 1 and 2 to their active positions, shown in FIG. 4, small plate 6 firstly presses membrane 11 against film 1 which, in its turn, presses original 2 against plate 7, after which it compresses springs 13 until seal 10 bears sealingly against plate 7.

As we can see from FIGS. 1 and 2, body 8 contains a chamber 17 around recess 9, this chamber being suitable for connection to a vacuum source (not shown) by a conduit 18 and communicating, via a series of orifices 19, with chamber 20 shown in FIG. 4) which is delimited by plate 7, body 8, joint 10 and membrane 11 when frame 5 and support 7 are in their active positions.

By connecting chamber 17 to the vacuum source when the frame and the support are in their active positions, a negative pressure is created in chamber 20 which makes it possible to remove the air bubbles trapped between the film 1 and original 2 and to press the latter intimately against one another, which is essential to the reproduction of images of excellent quality.

For the sake of completeness, it is pointed out that the lower face of small plate 6 is provided with grooves 21 intersecting at right-angles. These grooves prevent air bubbles from being trapped between membrane 11 and small plate 6, and prevent film 1 and original 2 from coming into intimate contact.

The reproduction device shown in FIGS. 5 and 6 will now be described.

In this form of embodiment, support 7 includes a body 22 provided with a central rectangular recess 23 delimiting window 4, and a rectangular seal 24 fixed to the lower face of body 22, around window 4.

It will be noted here that the original 2 is fixed to the lower face of body 22 and that the window has a cross-section that decreases downwards, in the direction of propagation of the light emitted by the light source, again to remove parasitic reflections.

Frame 5 is formed, for its part, by a plate 25 located beneath body 22 and whereof the upper face, which bears pressing means 6, is clad with a membrane 26 fixed along its periphery by conventional fixing means 27 such as screws.

Pressing means 6 are formed by a small plate slightly projecting out of a cavity 28 provided in plate 25, under the effect of springs 29 that hold it against membrane 26.

To return to body 22, it will be noted that it contains a chamber 30 around recess 23. This chamber is designed to be connected to a vacuum source (not shown) by a conduit 31, while a series of orifices 32 are provided to connect it to chamber 33 (shown in FIG. 6), which is delimited by body 22, seal 24 and membrane 26 when frame 5 and support 7 are in their active positions.

Figure 5:
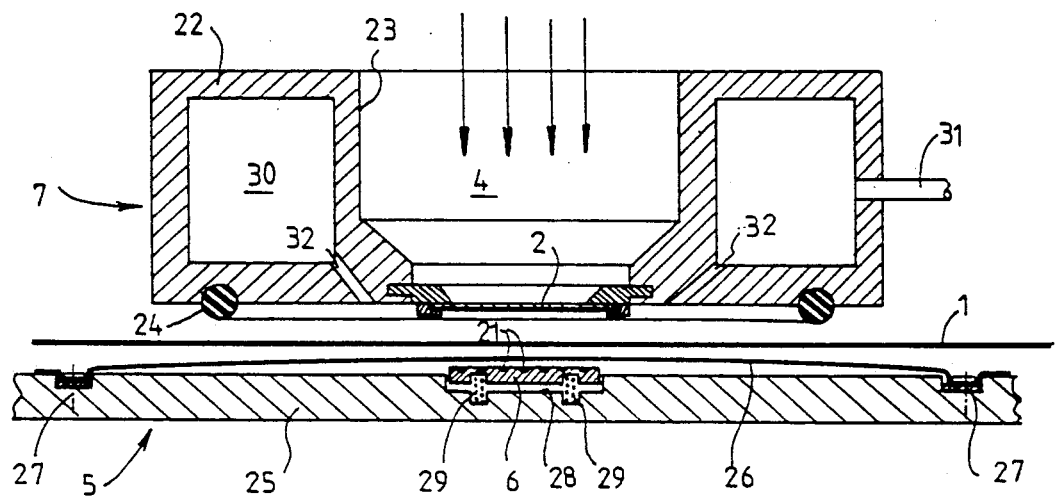
FIG. 5 is a schematic cross-sectional view of another reproduction device according to the invention, this cross-section corresponding to that of FIG. 2 and showing the support and the frame in inactive position.
Figure 6:
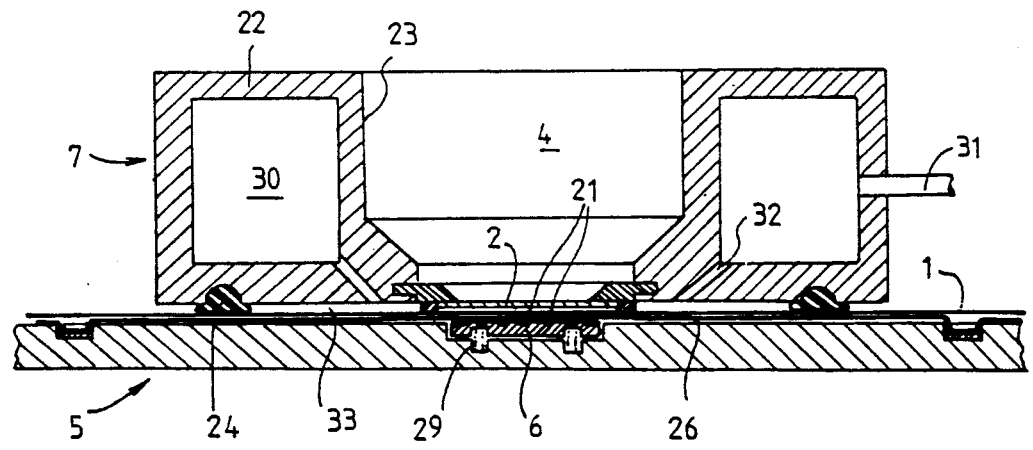
FIG. 6 is a view analogous to that of FIG. 5, but showing the support and the frame in active position.

When frame 5 and support 7 are displaced from their inactive positions, shown in FIG. 5, to their active positions, shown in FIG. 6, small plate 6 first of all presses membrane 26 against film 1, which, in its turn, presses original 2 against body 22, after which it penetrates cavity 28 against the bias of springs 29 to allow seal 24 to bear sealingly against membrane 26.

By connecting chamber 30 to the vacuum source when frame 5 and support 7 are in their active positions, there can be created in chamber 33 a negative pressure sufficient to remove the air trapped between film 1 and original 2 and to place the latter in intimate contact.

Finally, it should be pointed out that the upper face of small plate 6 is provided with grooves intersecting at right-angles, these grooves preventing air from remaining trapped between small plate 6 and membrane 26 and hindering the creation of an intimate contact between film 1 and original 2.

The two reproduction devices that have just been described must be used in a dark room in order to prevent over-exposure of film 1 under the effect of daylight or artificial light.

Their operation is particularly simple. To reproduce on film 1 an image formed on original 2, it suffices, in fact, to perform the following operations:

fixing original 2 in front of window 4;

inserting film 1 between frame 5 and support 7;

moving frame 5 and support 7 from their inactive positions to their active positions;

connecting to the vacuum source the chamber delimited by frame 5 and support 7 when these are in their active positions; and exposing film 1 through original 2.

If it is now wished to reproduce on film 1 an image formed on a second original 2, the film is displaced longitudinally by a distance corresponding to the length of the original, the first original is replaced by the second one, which is fixed in front of window 4, frame 5 and support 7 are placed in their active positions, the chamber delimited by the latter is connected to the vacuum source, and film 1 is exposed through the second original.

One can, of course, proceed to the development stage when the desired number of images has been reproduced on the film.

For the sake of completeness, it is pointed out that membranes 11 and 26 could be clad on their faces turned towards the film with an air-permeable material designed, when the support and the frame are displaced from their inactive positions to their active positions, to ensure a more uniform pressure on the totality of the surfaces opposite the film and the original, in order to remove the air bubbles completely. This arrangement is more particularly useful for the reproduction of large formats

I claim:

1. Device for reproducing images, by contact, on an unexposed photographic film (1) from a transparent original (2), notably a photographic negative or a slide, of the type comprising a support (3) provided with a window (4), the original being intended to block the window, while the film is intended to be placed in front of the original, a frame (5) located in front of the support (3) and provided with pressing means (6), the support and the frame being displaceable in relation to one another between an inactive position in which the pressing means cannot exercise any action on the film or the original, and an active position in which the pressing means can press the film against the original, and the latter against the support, means for creating a negative pressure between the original and the film when the support and the frame are in their active positions, and a light source to print the film through the original, characterized in that the support (3) is formed by a plate (7), while the frame (5) comprises a body (8) provided with a central recess (9) located opposite the window (4) and the dimensions of which are greater than those of the latter, an annular seal (10) fixed around the recess, on the portion of the body that is turned towards the plate, and a membrane (11) fixed at the portion of the body that faces away from the plate and projecting out of the recess in such a way that it comes closer to the plate than the seal does under the action of the pressing means (6), the plate, the body, the seal and the membrane delimiting, in the active positions of the support and the frame, a negative pressure chamber (20) suitable for connection to a vacuum source.

2. Device according to claim 1, characterized in that the pressing means (6) are formed by a small plate held by elastic members (13) against the face of the membrane (11) which faces away from the film (1) and the original (2).

3. Device according claim 2, characterized in that the small plate (6) bears, on its face opposite the membrane (11), rods (12) around which are disposed helicoidal springs (13), these rods freely passing through a cover (14) fixed to the portion of the body (8) that faces away from the seal (10), while the springs (13) are compressed between the small plate (6) and the cover (14).

4. Device according to claim 3, characterized in that the cover (14) and the membrane (11) are fixed to the body (8) of the frame (5) by common fixing members (16).

5. Device according to claim 1, characterized in that the body (8) of the frame (5) contains, around the recess (9), a buffer chamber (17) suitable for connection to the vacuum source, the portion of the body of the frame that delimits the negative pressure chamber (20) being provided with a series of orifices (19) designed to connect the latter to the buffer chamber (17).

6. Device for reproducing images, by contact, on an unexposed photographic film (1) from a transparent original (2), notably a photographic negative or a slide, of the type comprising a support (3) provided with a window (4), the original being intended to block the window, while the film is intended to be placed in front of the original, a frame (5) located in front of the support (3) and provided with pressing means (6), the support and the frame being displaceable in relation to one another between an inactive position in which the pressing means cannot exercise any action on the film or the original, and an active position in which the pressing means can press the film against the original, and the latter against the support, means for creating a negative pressure between the original and the film when the support and the frame are in their active positions, and a light source to print the film through the original, characterized in that the support (7) comprises a body (22) provided with a central recess (23) delimiting the window (4), and an annular seal (24) fixed around the window, on the portion of the body (22) that is turned towards the frame (5), which includes a plate (25) whereof the face turned towards the body bears pressing means (6) and is clad with a membrane (26) covering the latter, the body, the seal and the membrane delimiting, in the active position of the support (7) and of the frame (5), a negative pressure chamber (33) suitable for connection to a vacuum source.

7. Device according to claim 6, characterized in that the body (22) of the support (7) contains around the recess (23) a buffer chamber (30) suitable for connection to the vacuum source, the portion of the chamber (22) that delimits the negative pressure chamber (33) being provided with a series of orifices (32) designed to connect the latter to the buffer chamber (30).

8. Device according to claim 6, characterized in that the pressing means (6) are formed by a small plate projecting slightly out of a cavity (28) provided in the plate (25) under the action of elastic members (29) pressing it against the membrane (26).

9. Device according to claim 2 or 8, characterized in that the small plate (6) comprises grooves (21) on its face turned towards the membrane (11, 26).

* * * * *